United States Patent Office 3,257,344
Patented June 21, 1966

3,257,344
LITHOGRAPHIC INKS COMPRISING A SOLVENT COMPRISING TRIDECYL ALCOHOL
Daniel J. Carlick, Berkeley Heights, and Joseph W. Skrabak, Metuchen, N.J., assignors to Interchemical Corporation, New York, N.Y., a corporation of Ohio
No Drawing. Filed Sept. 7, 1962, Ser. No. 222,194
10 Claims. (Cl. 260—21)

This is a continuation-in-part of our application Serial Number 69,264, filed November 15, 1960, now abandoned.

This invention relates to new lithographic inks. More particularly it relates to novel inks used in lithographic printing on tinplate. These inks are fast drying when baked at temperature of 300° F. and above and include novel white inks which retain their color and do not yellow when baked and rebaked at temperatures as high as 400° F. and above. In addition, the inks of this invention are scratch resistant, show good adhesion to metals, and are resistant to alkaline pasturization and steam processing.

Because of increased production schedules in the food canning industry, there is a constant demand for faster drying inks to be used in lithographic printing on tinplate from which food cans are produced. Such inks will be referred to in this specification as "tin printing inks." In addition there is an equal demand in this industry for a white ink, which when applied to tinplate or tin cans is capable of withstanding the various processes to which tin cans are subjected. These processes include alkaline pasteurization, steam processing, and, most important, baking and rebaking at temperatures as high as 400° F. Since most white inks tend to discolor or yellow when subjected to such baking schedules, an ink which can retain its whiteness under such high heat is a very desirable commercial product.

In the past, the "tin printing" art has been striving to produce faster drying inks as well as white inks having the above described desirable properties.

Drying oil alkyds and semi-drying oil alkyds have been used in "tin printing" inks for many years. Before proceeding further, the terms to be used in connection with alkyd resins in the folowing specification should be defined. Alkyd resins are defined as the resinous esters of the reaction of polybasic acids such as phthalic and maleic acids and their anhydrides and polyhydric alcohols such as glycerol and pentaerythritol. In a great many alkyds, the resinous ester is modified with drying, semi-drying and non-drying oils. Drying oil alkyds are alkyds which dry in air and are modified by the fatty acids of drying oils such as linseed oil, dehydrated castor oil, menhaden oil and perilla oil. Semi-drying oil alkyds are alkyds which dry on baking and are modified by the fatty acids of semi-drying oils such as soya bean oil. Non-drying alkyds are alkyds which normally do not dry even on baking and are modified by the fatty acids of non-drying oils such as cocoanut oil, castor oil and cottonseed oil.

Although the previously mentioned tin printing inks containing drying and semi-drying alkyds displayed excellent lithographic properties such as press stability, hydrophobicity, transferability and non-reactivity with the rubber rollers, they had poor color retention on initial baking and rebaking, particularly in the case of white inks and in many instances, did not meet higher drying speeds demanded by the canning industry. Attempts were made to produce white inks having desirable color retention by using non-drying alkyds in place of drying oil alkyds. These displayed good color retention but would not dry even upon baking.

While "amino resins"—namely urea-formaldehyde and maleamine-formaldehyde resins—have for many years been used in metal coatings blended with oil modified alkyds to promote faster drying, these blends were thought to be unutilizable in lithographic printing on tin because such blends were used for metal coatings in aromatic solvents such as xylol, or mixtures of xylol and butanol. Vehicles of these blends in aromatic solvents attacked the rubber rollers in the lithographic press, lacked the requisite press stability, and had poor lithographic properties. Very few non-aromatic solvents for blends of "amino resins" and oil modified alkyds were available and those available produced vehicles having less than desirable lithographic properties.

There have now been discovered novel lithographic inks which dry very rapidly on baking. Further, they include white inks which do not discolor on initial bake or on rebaking at temperatures of 400° F. and higher.

These novel inks comprise pigment dispersed in a vehicle comprising a blend of "amino resins" and oil modified alkyds in tridecyl alcohol as solvent. Besides their rapid drying and good color-retaining properties, these inks have excellent lithographic properties including non-reactivity with rubber rollers and press stability. Because high percentages of amino resins may be used very rapid drying may be secured. In addition, it is now possible to blend non-drying oil modified alkyds with "amino resins" in tridecyl alcohol and pigment and obtain an ink which will cure upon baking to white ink substantially free of discoloration, even when rebaked at 400° F. and higher temperatures. In the compounding of such inks a solution of butylated benzo-guanamine-formaldehyde resin in tridecyl alcohol is preferably used rather than the resin as a solid. Convenient concentrations are 20 to 70 parts by weight of the resin.

The fatty oil acid modified alkyd resins preferably used in this invention are those of 40% to 65% fatty oil acid length and having acid numbers of from 10 to 20, although the fatty oil acid length is not critical and alkyds having values as low as 30% and values higher than 65% have been used. These alkyds are prepared from fatty oil acid alkyd forming polyhydric alcohols and alkyd forming polycarboxylic acids. Drying, semi-drying and non-drying oil alkdys, or in general those conventionally used in coatings and inks can be used in the invention. These include linsed oil, dehydrated castor oil, menhaden oil, perilla oil, safflower oil, soya oil, castor oil and cocoanut oil modified alkyds among others.

Alkyd-resin-forming polyhydric alcohols which are operable in preparing the modified alkyd resins used in the present invention include trihydric alcohols such as glycerol, tetrahydric alcohols such as erythritol, and pentaerythritol, and hexahydric alcohols such as mannitol and sorbitol. It will be seen that these alcohols are those which are conventionally used in preparing alkyd resins and our numerous experiments indicate that the invention is operable with alkyd-resin-forming polyhydric alcohols in general. The term "alkyd-resin-forming polyhydric alcohol" is meant to include polyhydric compounds which are conventionally used in the manufacture of alkyds and which, as those persons skilled in the art know, do not contain all sorts of reactive substituents which alter the course of the alkyd-resin-forming reaction. Such substances as cellulose, starch, and sugars are therefore excluded. The polyhydric alcohols, which are alkyd-resin-forming polyhydric alcohols, are in general, polyhydric alcohols containing from three to about ten hydroxyl groups, and containing no other substituent groups that are reactive under the conditions used in preparing alkyd resins. A minor amount of dihydric alcohols can be used along with the higher polyfunctional alcohols if desired.

The alkyd-resin-forming polycarboxylic acids are the polycarboxylic acids conventionally used in preparing alkyds; they include phthalic acid and anhydride, maleic and fumaric acids and anhydrides, adipic and succinic acids, and Petrex Acids among others.

The alkyds used in this invention are prepared by the conventional methods for preparing alkyds. These methods include the direct fusion of the fatty oil acids, the alkyd-forming polyhydric alcohols and the alkyd-forming polyhydric acids. These are heated at 450° F. to 480° F. until the esterification has progressed to the point that the acid value is from 10 to 20. Optionally, the fatty oil acids may be first reacted with the polyhydric alcohol and then the product reacted with the polybasic acids (which react more rapidly than the fatty acids). This method insures the complete reaction of the fatty oil acids. If an oil is used instead of a fatty acid, it must first be converted to a monoglyceride. This is accomplished by first heating a mixture of the oil and the polyhydric alcohol until the product makes a clear solution in methyl alcohol. This is the conventional alcoholysis process used in the preparation of oil modified alkyds. Instead of direct fusion, the alkyds may be prepared in the presence of a solvent. Conventionally, about 10% solvent based upon the total mixture weight is sufficient.

Any of the standard commercial organic solvent soluble melamine-formaldehyde and urea-formaldehyde resins are operable in this invention. These include the triazines such as guanamines, substituted melamines, and amelines. The inks of this invention are preferably made with butylated benzoguanamine-formaldehyde resin and it is preferably added as a 25 to 70% solution in tridecyl alcohol.

In accordance with a further specific embodiment of our invention, we have found that the use of the hexamethyl ether of hexamethylol melamine, a melamine-formaldehyde material in combination with tridecyl alcohol and alkyd resin in the standard varnish of this invention will provide a composition in which greater amounts of this melamine-formaldehyde material may be used in the varnish without increasing the viscosity of the varnish above a suitable lithographic printing viscosity. Through the use of this composition which has a higher melamine-formaldehyde content, graying in white inks printed on tin may be reduced. The phenomenon known as graying is actually due to the gray tin substrate showing through the white coating. It is believed that the higher content of solid material permits less of the subtrate to show through and prevents graying.

While, as has been heretofore stated, this invention provides an excellent white ink for tin printing, it is not intended to limit the practice of this invention to only white inks. Other conventional pigments may be used with the vehicles of this invention to provide tin printing inks which meet the demands of the food canning industry for a rapidly drying tin printing ink.

The following examples will illustrate the practice of this invention.

OIL MODIFIED ALKYDS

Example 1

63.4 g. of alkaline refined soya oil, 12.8 g. of pentaerythritol and 0.1 g. of litharge were heated to and maintained at 480° F. until alcoholysis was complete as indicated when 3 volumes of methyl alcohol were soluble in one volume of the reaction product. The temperature was then reduced to 380° F., 23 g. of phthalic anhydride and 0.85 g. of maleic anhydride were added and the temperature was raised to and maintained at 480° F. until the mixture had an acid number of 10 to 12. The product had a viscosity of 385 to 450 poises.

Example 2

53 parts by weight of dehydrated castor oil fatty acid were heated to 340° F. under a $CO_2$ atmosphere and 19.6 parts of pentaerythritol added. The mixture was then heated to 450° F. and maintained at that temperature until an acid value of 20 was reached, at which point, 8.4 parts of p-tertiary butyl benzoic acid and 23 parts of a resinous polybasic acid formed by the condensation of terpene and maleic anhydride were added. The mixture was heated to and maintained at 450° to 453° F. until an acid value of 15 was reached. The product was then allowed to cool and 0.4 part of tridecyl alcohol and 13.4 parts of an aliphatic hydrocarbon solvent having a K.B. value of 20–25 and a boiling range of 533° to 582° F. were added. The product was then filtered through a double layer of cheesecloth. Its acid value was 14.

Example 3

58 parts by weight of soya fatty acids were heated to 350° F. over a period of 1 hour, 10.8 parts of pentaerythritol were added and the mixture heated to 450° F. and maintained at that temperature for 30 minutes. 10.9 parts of additional pentaerythritol were added and the mixture was maintained at 450° F. until an acid number of 2 to 5 was reached. The temperature was then reduced to 350° F. and 22.7 parts of phthalic anhydride and .843 part of maleic anhydride were added. The temperature was then raised to 450° F. over a period of one hour and the mixture maintained at that temperature until an acid number of 12 to 15 was reached. A sufficient quantity of an aliphatic solvent having a K.B. value of 26 to 28 and a boiling range of 548° to 584° F. was added to reduce the solids content of the product to 80% by weight. The final product had a viscosity of 385 to 450 poises.

Example 4

42 parts by weight of soya fatty acids, 7 parts of a commercial composition containing 60% by weight of lauric acid, 18% of myristic acid, 7% oleic acid, 7% palmitic acid, 3% capric acid, 3% linoleic acid, 1% caprylic acid and 1% stearic acid, 0.2 part of triphenyl phosphite and 18.1 parts of pentaerythritol were heated to 480° F. and maintained there until an acid number of 15 to 20 was reached. The temperature was then reduced to 380° F. and 26.8 parts of phthalic anhydride, 1 part of maleic anhydride, and 7.3 parts of of diethylene glycol were added. The temperature was raised to 480° F. and maintained at that level until an acid number of 14 to 16 was reached. A sufficient quantity of an aliphatic solvent having a K.B. value of 26 to 28 and a boiling range of 548° to 584° F. was added to reduce the solids content of the product to 74% solids by weight. The product had a viscosity of 385 to 450 poises.

Example 5

45 parts by weight of cocoanut fatty acids, 33 parts of phthalic anhydride, and 23 parts of glycerine were mixed, heated to 450° F. and maintained at that temperature until an acid number of 13 to 16 was reached.

INKS

Example 6

The following ingredients are mixed:

| | Parts by weight |
|---|---|
| The oil modified alkyd of Example 1 | 38.6 |
| 67% solution of butylated benzoguanamine-formaldehyde resin in tridecyl alcohol | 4.1 |
| Aliphatic solvent having a K.B. value of 26 to 28 and a boiling range of 548° to 584° F. | 4.9 |
| Titanium dioxide pigment | 53.0 |
| Hydrated silicon dioxide | 1.9 |

The resulting ink was drawn down on a tin panel. It dried rapidly upon baking, showing an excellent cure after being baked at 300° F. for 12 minutes. It showed substantially no discoloration after being rebaked for an additional 10 minutes at 350° F. and then cumulatively at 400° F. for 10 minutes and 450° F. for 10 minutes.

Baked films of the ink displayed good alkaline pasteurization resistance and steam processing resistance. Baked coated tin panels of the ink remained unchanged after being immersed in an alkaline pasteurization solution for 20 minutes at a temperature of 140° F. The coated panel also withstood contact with steam at 15 lbs. steam pressure for 1½ hours.

*Example 7*

The procedure of Example 6 was repeated using the oil modified alkyd of Example 2 in place of the alkyd of Example 1. The resulting ink had properties equivalent of those of the ink of Example 6.

*Example 8*

The procedure of Example 6 was repeated using the alkyd of Example 3. The resulting ink had properties equivalent to those of the ink of Example 6.

*Example 9*

The procedure of Example 6 was repeated using the alkyd of Example 4. The resulting ink had properties equivalent to those of the ink of Example 6.

*Example 10*

Example 6 was repeated with the same ingredients and an additional 0.5 part of a commercial rare earth drier comprising a metallic 2-ethyl hexoate solution in mineral spirits of cerium and lanthanium having a 6% metal content and a 28.6% solids content by weight, sold under the trademark "Hexogen 6%." The resulting ink had properties equivalent with those of the ink of Example 6.

*Example 11*

The following ingredients were mixed:

| | Parts by weight |
|---|---|
| The oil modified alkyd of Example 1 | 33.3 |
| 67% solution of butylated benzoguanamine-formaldehyde resin in tridecyl alcohol | 9.4 |
| Aliphatic solvent having a K.B. value of 26 to 28 and a boiling range of 548° to 584° F. | 4.9 |
| "Hexogen 6%" rare earth drier | 0.5 |
| Titanium dioxide pigment | 53.0 |
| Hydrated silicon dioxide | 1.9 |

The resulting ink was faster drying than the ink of Example 6, showing an excellent cure after being baked on a tin panel at 300° F. for 10 minutes. It was equivalent to the ink of Example 6 in all other properties.

*Example 12*

The following ingredients were mixed:

| | Parts by weight |
|---|---|
| The oil modified alkyd of Example 1 | 21.3 |
| 67% solution of butylated benzoguanamine-formaldehyde resin in tridecyl alcohol | 21.3 |
| Aliphatic solvent having a K.B. value of 26 to 28 and a boiling range of 548° to 584° F. | 6.0 |
| "Hexagen 6%" rare earth drier | 0.5 |
| Titanium dioxide pigment | 53.0 |
| Hydrated silicon dioxide | 1.9 |

The resulting ink was faster drying than the ink of Example 6, showing an excellent cure fater being baked on a tin panel at 300° F. for 8 minutes. It was equivalent to the ink of Example 6 in all other properties.

*Example 13*

The following ingredients were mixed:

| | Parts by weight |
|---|---|
| Butylated urea-formaldehyde resin | 10 |
| Alkyd of Example 5 | 30 |
| Tridecyl alcohol | 60 |

The resulting varnish was drawn down on a tin panel and tested for curing and discoloration. It showed an excellent cure after being baked for 15 minutes at 300° F. The baked panel was then cumulatively baked at 350° F. for 10 minutes, 400° F. for 10 minutes and 450° F. for 10 minutes. Discoloration was observed. The baked panels also displaced good alkaline and steam pasteurization resistance.

*Example 14*

The following ingredients were mixed:

| | Parts by weight |
|---|---|
| Butylated melamine-formaldehyde resin | 12.5 |
| Alkyd of Example 5 | 37.5 |
| Tridecyl alcohol | 50.0 |

The procedure of Example 13 was repeated. The resulting varnish had the same properties as the varnish of Example 13 but showed substantially no discoloration on initial baking or rebaking.

*Example 15*

Example 13 is repeated using the following proportions by weight:

| | Parts by weight |
|---|---|
| Butylated urea-formaldehyde resin | 20 |
| Alkyd of Example 5 | 20 |
| Tridecyl alcohol | 60 |

The color retention was excellent and the cured film was harder than that of Example 13. In all other respects the varnish was equivalent to the varnish of Example 13.

*Example 16*

Example 14 was repeated using the following proportions by weight:

| | Parts by weight |
|---|---|
| Butylated melamine-formaldehyde | 25 |
| Alkyd of Example 5 | 25 |
| Tridecyl alcohol | 50 |

The color retention was excellent and the cured film harder than that of Example 14. In all other respects the varnish was equivalent to the varnish of Example 14.

*Example 17*

The varnishes of Examples 13 and 16 were then pigmented by adding 1 part of titanium dioxide white pigment to 1 part by weight of varnish. The resulting inks were drawn down on tin panels and baked. Each showed an excellent cure after being baked at 300° F. for 15 minutes. The inks having the varnishes of Examples 14 and 16, which contained the butylated melamine-formaldehyde, showed no yellowing even after being rebaked cumulatively as follows: 350° F. for 10 minutes, 400° F. for 10 minutes, and 450° F. for 10 minutes. The ink having the varnishes of Examples 13 and 15, which contained the butylated urea-formaldehyde, showed some yellowing upon being rebaked at the same schedule.

*Example 18*

36.3 parts of caprylic acid, 30.4 parts of a technical grade of pentaerythritol consisting of 88% pentaerythritol and 12% dipentaerythritol, 29.6 parts of phthalic anhydride, 0.6 part of fumaric acid and 75 parts of xylol are heated at 275° C. until an acid number of 10 is measured in a 60% solution of the alkyd resin in xylol.

An ink is prepared by mixing 39.6 parts of the above alkyd resin, 10.4 parts of an 80% solution of hexamethylol melamine hexamethyl ether in tridecyl alcohol and 50 parts of titanium dioxide.

While there have been described what are considered to be the preferred embodiments of this invention, it will be understood that the practice of this invention is not limited to the resins and coatings described in

What is claimed is:

1. A varnish comprising a solvent comprising tridecyl alcohol and a binder including a resin selected from the group consisting of urea-formaldehyde and melamine-formaldehyde resins and an alkyd resin modified with a fatty oil acid having a chain length at least 8 carbon atoms.

2. A lithographic printing ink comprising the varnish defined in claim 1 having a pigment dispersed therein.

3. For use in high heat lithographic printing inks, a varnish comprising (1) and alkyd resin modified with a fatty oil acid having a chain length of at least 8 carbon atoms and (2) a solution consisting of a butylated benzoguanamine-formaldehyde resin in tridecyl alcohol.

4. A high heat lithographic printing ink comprising the varnish defined in claim 3 having a pigment dispersed therein.

5. As a component of a high-heat lithographic ink, a solution comprising a solution of a butylated benzoguanamine-formaldehyde resin in tridecyl alcohol.

6. A heat curable white lithographic ink comprising a white pigment dispersed in a vehicle comprising an aliphatic solvent comprising tridecyl alcohol and a binder consisting of a triazine-formaldehyde resin and a nondrying alkyd.

7. A heat curable white lithographic ink comprising a white pigment dispersed in a vehicle comprising an aliphatic solvent comprising tridecyl alcohol and a binder consisting of butylated benzoguanamine-formaldehyde resin and a cocoanut oil modified alkyd.

8. A varnish according to claim 1 wherein said alkyd is modified with a dehydrated castor oil fatty acid.

9. A varnish according to claim 1 wherein said alkyld is modified with a soya oil fatty acid.

10. A varnish comprising an aliphatic solvent comprising tridecyl alcohol and a binder including the hexamethyl ether of hexamethylol melamine and an alkyd resin modified with a fatty oil acid having a chain length of at least 8 carbon atoms.

References Cited by the Examiner

UNITED STATES PATENTS

| | | | |
|---|---|---|---|
| 2,324,671 | 7/1943 | Bernstein | 106—27 |
| 2,416,620 | 2/1947 | Gans et al. | |
| 2,851,429 | 9/1958 | Petropoulos | 260—21 |
| 2,871,209 | 1/1959 | Shelley | 260—21 |
| 2,998,411 | 8/1961 | Housekeeper | 260—21 |
| 3,102,866 | 9/1963 | Moffett et al. | 260—21 |

LEON J. BERCOVITZ, *Primary Examiner.*

JAMES A. SEIDLECK, *Examiner.*

R. W. GRIFFIN, *Assistant Examiner.*